(No Model.) 2 Sheets—Sheet 1.

W. H. HALL.
TEDDER FRAME AND RAKE HEAD.

No. 448,232. Patented Mar. 17, 1891.

Witnesses:
Inventor:
William H. Hall,
By Parkinson & Parkinson,
His Attorneys.

(No Model.) 2 Sheets—Sheet 2.

W. H. HALL.
TEDDER FRAME AND RAKE HEAD.

No. 448,232. Patented Mar. 17, 1891.

Attest
August T. Sabsleb.
James N. Ramsey.

William H. Hall,
Inventor
By Parkinson & Parkinson,
His Att.ys.

UNITED STATES PATENT OFFICE.

WILLIAM H. HALL, OF TIFFIN, OHIO.

TEDDER-FRAME AND RAKE-HEAD.

SPECIFICATION forming part of Letters Patent No. 448,232, dated March 17, 1891.

Application filed April 14, 1890. Serial No. 347,918. (No model.)

*To all whom it may concern:*

Be it known that I, WILLIAM H. HALL, a citizen of the United States, residing at Tiffin, in the county of Seneca and State of Ohio, have invented a certain new and useful Improvement in Tedder-Frames and Rake-Heads, of which the following is a specification.

The length of tedder-frames and rake-heads as at present constructed is limited to the space which can be covered in the average meadow by a rigid tedder-frame or rake-head without serious disadvantages resulting from inequalities of surface. Few, if any, meadows have a surface sufficiently even to permit the use of a long tedder-frame or rake-head. Various attempts have been made to overcome this difficulty, but, so far as I am aware, none of them have been successful. A construction which would enable a much wider sweep to be covered by a single tedder or rake could be operated by the same team and driver and would result in a saving of labor and expense practically corresponding to the increased sweep.

It is the object of my invention to provide such a construction; and the invention consists in constructing the tedder-frame or rake-head in sections and in providing suitable supports for the several sections, and means by which the operative mechanism of the several sections may be controlled by the same operator.

I have illustrated my invention as applied to a tedder-frame.

Figure 1:
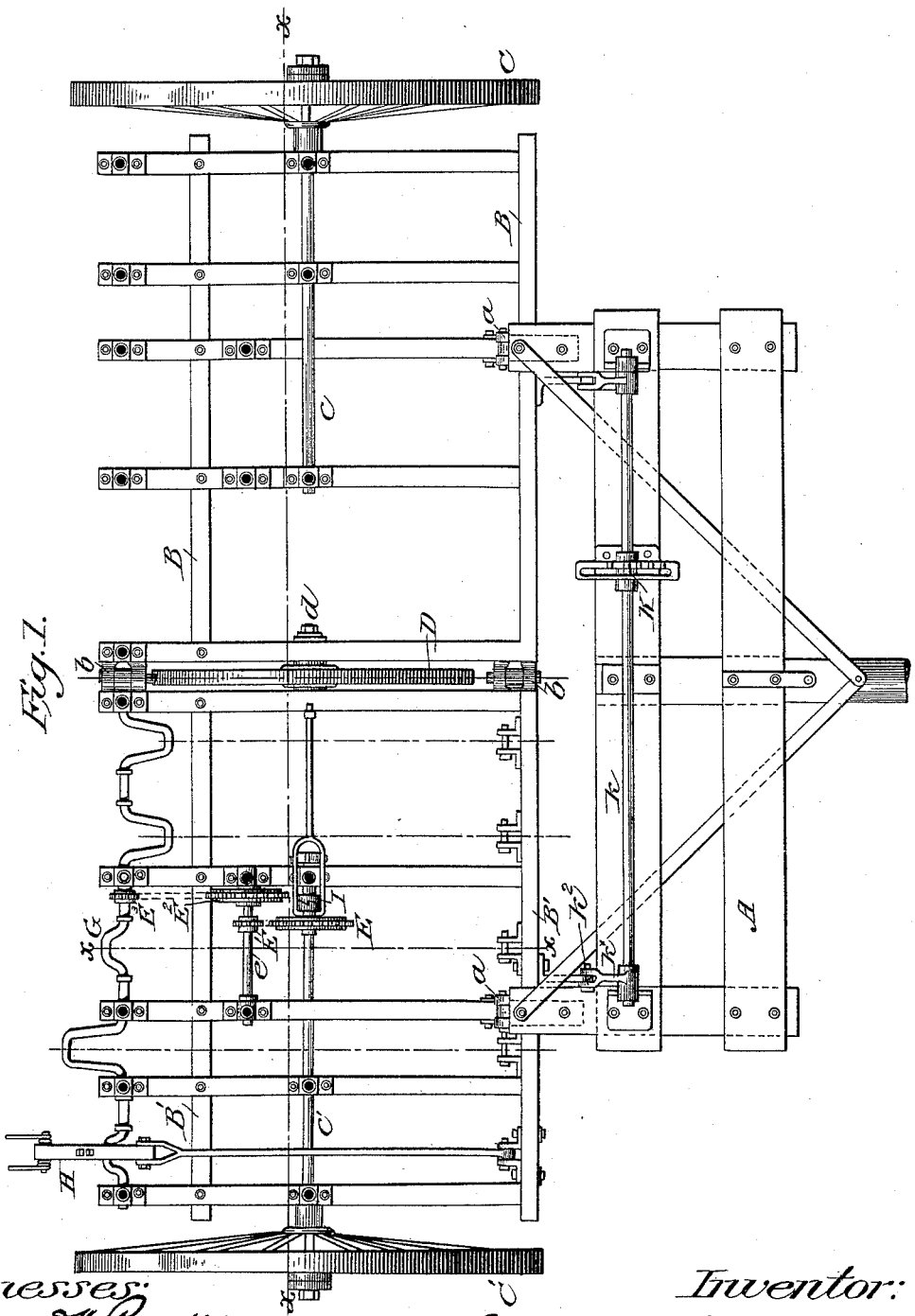
Figure 2:
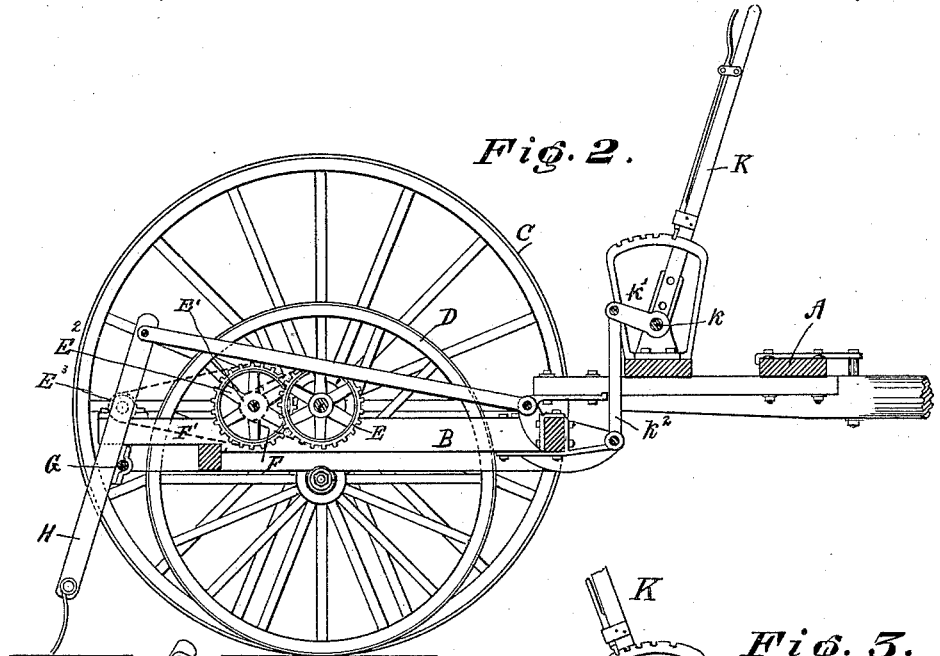
Figure 3:
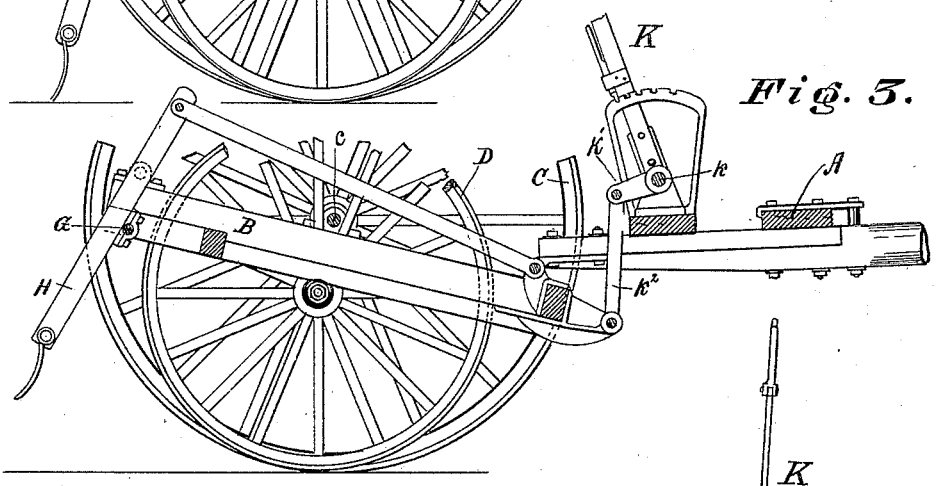
Figure 4:
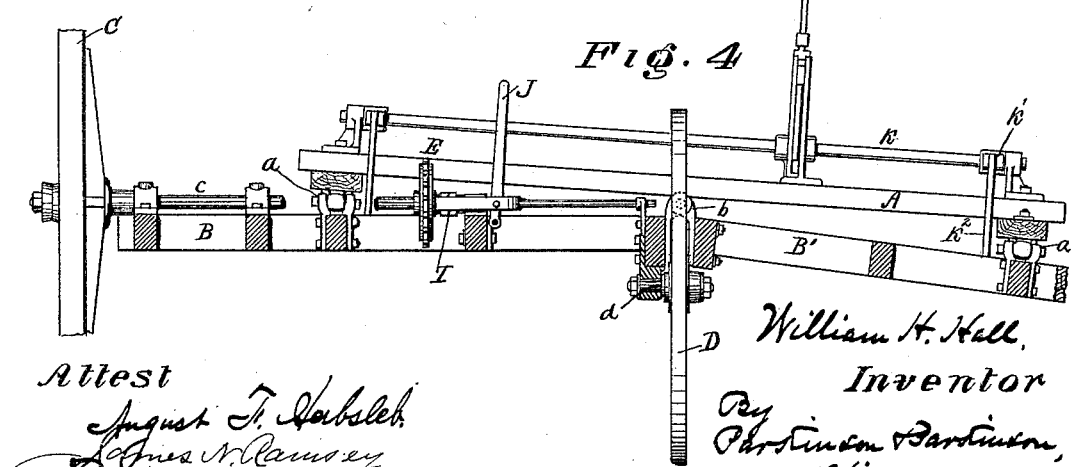

In the drawings, Figure 1 is a top view of a hay-tedder embodying my invention. Fig. 2 is a sectional view on the line $x\,x$ of Fig. 1. Fig. 3 is a sectional view on the same line, but showing the tedder-frame tilted out of its working position. Fig. 4 is a sectional view on the line $y\,y$ of Fig. 1.

A is the draft-frame.

B B′ are sectional frames connected by hinges $b\,b$ and loosely connected with the draft-frame by hinges $a\,a$ in such manner as to permit each frame to tilt relatively to the draft-frame in a vertical plane at right angles to the line of draft, as well as in a vertical plane coincident to the line of draft.

C C′ are supporting and driving wheels fixed to axles $c\,c'$, mounted in suitable bearings in the frames B B′. The inner ends of the frames are supported by a third or intermediate wheel D, mounted upon a short axle $d$, journaled in one of the sectional frames. The tedder-forks may be of any desired construction and may be driven by any suitable system of gearing. In the form illustrated a sprocket-wheel E upon the axle $c$ is connected by means of a drive-chain F with a second and smaller sprocket-wheel E′, fixed upon a spindle $e$. A third sprocket-wheel $E^2$ upon the spindle $e$ is connected by means of drive-chain F′ with a small sprocket-wheel $E^3$ upon the crank-shaft G, by which the pitching motion is imparted to the tedder-forks H. The sprocket-wheel E is loosely mounted upon the axle $c$, but may be locked thereto by means of a clutch I, actuated by a lever J. It will be understood that each sectional frame is provided with a separate crank-shaft.

To enable the operator to regulate the working position of the forks and to lift them out of their working position, in order to avoid obstructions, or for transportation, the tedder is provided with a hand-lever K, fitted to a shaft $k$, mounted upon the draft-frame. This shaft is connected by cranks $k'$ and pitmen $k^2$ to the front of each of the sectional frames at points in advance of the hinges $a\,a$. It will be seen that by actuating the lever the rear ends of the sectional frames and the tedder-forks carried thereon may be raised or lowered concurrently.

I claim as my invention—

1. The combination of a draft-frame, sectional frames loosely attached thereto and carrying the forks or teeth, suitable carrying-wheels, and an intermediate wheel supporting the inner ends of the sectional frames, substantially as and for the purpose specified.

2. The combination of a draft-frame, sectional frames hinged to each other, loosely attached to the draft-frame, and carrying the forks or teeth, suitable carrying-wheels, and an intermediate wheel supporting the inner ends of the sectional frames, substantially as and for the purpose specified.

3. The combination of a draft-frame, sectional frames loosely attached thereto, end wheels mounted upon independent axles and carrying the sectional frames, and an intermediate wheel supporting the inner ends of the sectional frames, substantially as and for the purpose specified.

4. The combination of a draft-frame, sectional frames hinged to each other and loosely attached to the draft-frame, end wheels mounted upon independent axles, and an intermediate wheel supporting the inner ends of the sectional frames, substantially as and for the purpose specified.

5. The combination of a draft-frame, sectional frames loosely attached thereto, wheels carrying their outer ends, an intermediate wheel supporting the inner ends of the sectional frames, and mechanism for tilting the sectional frames, substantially as and for the purpose specified.

6. The combination of a draft-frame, sectional frames attached thereto, wheels carrying their outer ends, an intermediate wheel supporting the inner ends of the sectional frames, a shaft connected by crank-arm and pitman with each of the sectional frames, and a lever for actuating said shaft, substantially as and for the purpose specified.

7. The combination of a draft-frame, sectional frames loosely attached thereto, wheels carrying their outer ends, an intermediate wheel supporting the inner ends of the sectional frames, a shaft connected by crank-arm and pitman with each of the sectional frames, a lever for actuating said shaft, and mechanism for locking the lever in position, substantially as and for the purpose specified.

8. The combination of a draft-frame, sectional frames carrying independent crank-shafts, upon which the forks are mounted, driving-wheels fixed to independent axles and carrying the sectional frames, an intermediate wheel supporting the inner ends of the sectional frames, and mechanism for communicating motion from the driving-wheels to the crank-shafts, substantially as and for the purpose specified.

WILLIAM H. HALL.

Witnesses:
 ROBERT LYSLE,
 NOBLE GROFF.